ELECTRICAL STAGES FOR PERFORMING LOGICAL FUNCTIONS

Filed June 20, 1957

Inventors
KENNETH CHARLES JOHNSON
GORDON GEORGE SCARROTT
By
Cameron, Kerkam & Sutton
Attorneys United States Patent Office 2,934,706

Patented Apr. 26, 1960

2,934,706

ELECTRICAL STAGES FOR PERFORMING LOGICAL FUNCTIONS

Kenneth Charles Johnson, Cheadle, and Gordon George Scarrott, Manchester, England, assignors to Ferranti, Limited, Hollinwood, England, a company of Great Britain and Northern Ireland Application June 20, 1957, Serial No. 666,908

Claims priority, application Great Britain June 28, 1956

7 Claims. (Cl. 328—92)

This invention relates to electrical stages for performing logical functions, hereinafter referred to for convenience as logical stages.

The invention has particular application to digital computers and will be described in that connection. It should however be understood that the invention is not restricted to such applications.

It is known that the design and maintenance of digital computers can be facilitated by constructing them from simple standardised stages which perform the basic "And," "Or," "Inhibit," or other operations. Such stages, as hitherto disclosed, are either limited to one such operation each, or, if designed for more than one such operation, possess a serious redundancy of components when used for one at least of the operations.

It is an object of the present invention to provide a single logical stage which is designed to perform any of the three operations above mentioned, and other operations of similar kind, without serious redundancy of components when used for any of the operations.

In accordance with the present invention an electrical stage for performing logical functions includes a transformer for deriving in a secondary winding from a plurality of primary currents a secondary current dependent on the algebraic sum of the primary currents, a generator for supplying a control voltage waveform defining alternate repetitive input and output periods, a capacitor connected to said secondary winding and to said generator in such manner that the charge in the capacitor is modified to a predetermined extent during each input period if and only if the said secondary current during that period is of a predetermined sense and value, a stabilised amplifier the input of which is connected to said capacitor and which is arranged to conduct a standardised output current during each output period if and only if the charge in the capacitor has been modified to said predetermined extent during the preceding input period, and means for ensuring direct-current restoration of said secondary winding during each output period.

In the accompanying drawings.

Figures 1, 2, 3, 4, 5, 6:
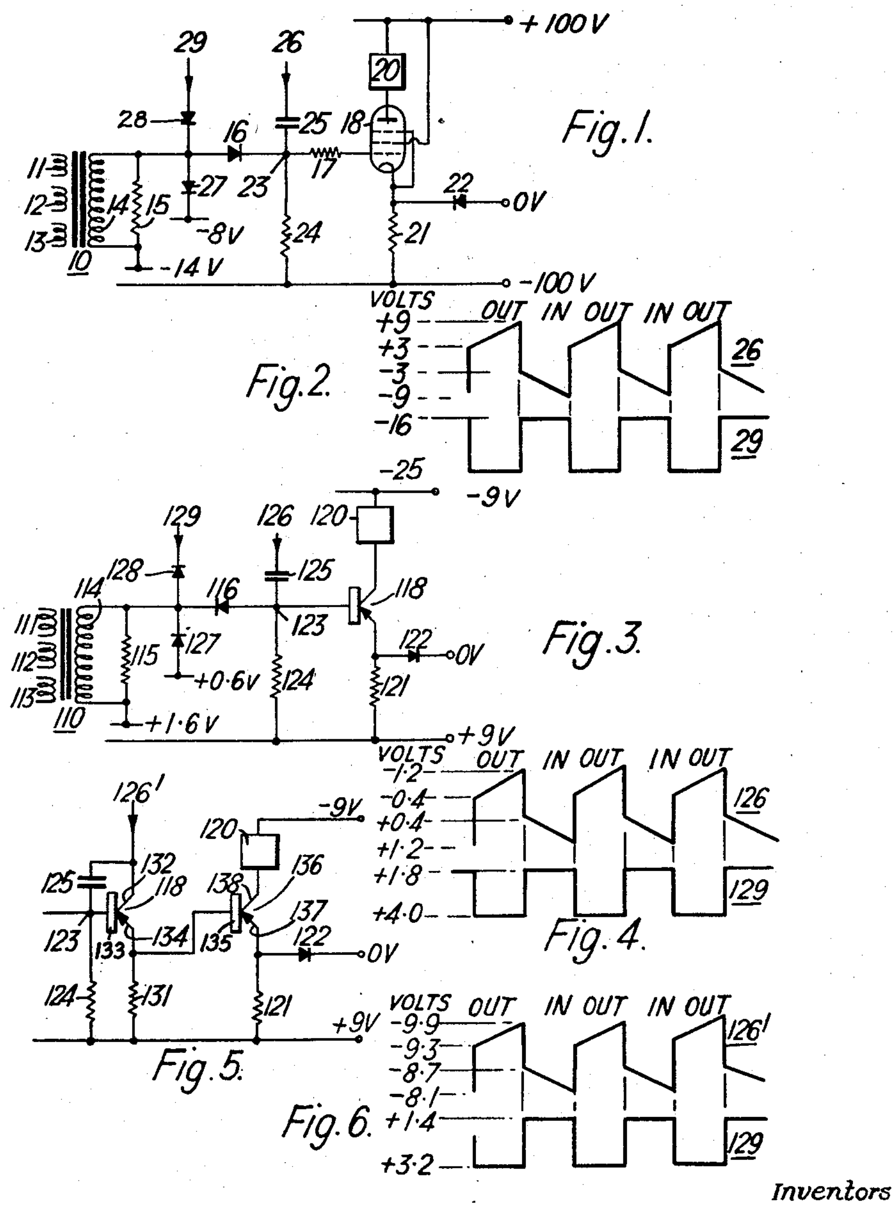
Figures 1 and 3 are schematic diagrams of two embodiments of the invention.
Figures 2 and 4 show voltage waveforms used in the embodiments of Figures 1 and 3 respectively.
Figure 5 shows a part of the stage of Figure 3 modified in accordance with a further embodiment.
Figure 6 shows the voltage waveforms used in the embodiment of Figure 5.

In carrying out the invention according to one form by way of example a logical stage for a digital computer includes a transformer 10 having three primary windings 11, 12 and 13 and one secondary winding 14. Each primary/secondary ratio is 1:3 and the transformer inductance is 6 mh. Secondary 14 is shunted by a damping resistor 15 of 18K. One end of this winding is connected to a bias source of −14 volts. The other end is connected to the anode of a germanium diode 16 of the type CV 448 the cathode of which is connected by way of a resistor 17 of 470 ohms to the control grid of a type EF 73 sub-miniature pentode amplifier valve 18. The anode of the valve is connected by way of a load 20, which may be one or more of the primary windings of another such logical stage, to a source of 100 volts positive, which source is connected direct to the screen grid of the valve. The cathode is connected by way of a resistor 21 of 12K to a source of 100 volts negative and to the cathode of a germanium diode 22 of the type CV 425 the anode of which is connected to a point at zero volts of the two sources. The suppressor grid of valve 18 is connected direct to its cathode. So long as pentode 18 is cut off at its control grid a steady current, determined by resistor 21, flows in diode 22.

The common point 23 of diode 16 and resistor 17 is connected to the −100 volt source by a resistor 24 of 470K. To common point 23 is applied by way of an integrating capacitor 25 of 33 pf. a control voltage waveform 26 (see Fig. 2) derived from a generator—which term should be understood in a broad sense as including any stage capable of deriving the waveform—which is not shown.

The anode of diode 16 is also connected to the anode of a germanium diode 27 and to the cathode of a diode 28; both these diodes are of the type CV 448. The cathode of diode 27 is connected to a bias source of −8 volts. To the anode of diode 28 is applied an auxiliary voltage waveform 29 (Fig. 2) derived from a generator not shown. In the absence of any input signals to the transformer a small "bleed" current flows through resistor 24 and diodes 16 and 28 in series during each input period.

Waveforms 26 and 29 define in synchronism with one another alternate repetitive input and output periods, as shown in Fig. 2, over the voltage ranges indicated.

The three primaries 11 to 13 are clearly "floating" as regards polarity and so may be energised in either sense by currents flowing in one or other direction. A primary current pulse of sense such as to drive the unbiased end of secondary 14 positively will hereinafter be referred to for convenience as a positive pulse, and vice versa. Each of primaries 11 to 13 is connected to the output of another logical stage (which may be similar to the stage under discussion) in the computer, or to a source which supplies a current pulse during every input period. The arrangement is such that during each input period each of primaries 11 to 13 is energised by a standardised current pulse—that is to say, by a current pulse of amplitude standardised throughout the computer—of one or other sense, or not energised at all, according to the function of the stage, in a manner to be hereinafter described.

In operation, therefore, the primary current pulses during each input period are combined in the transformer to produce in secondary 14 a current pulse proportional to their algebraic sum. In accordance with the convention, defined in the previous paragraphs, as to the senses of the primary currents, the unbiased end of secondary 14 is positive if the sum of the primary pulses is positive. If during any particular input period this sum exceeds a predetermined threshold value of positive sense the diode 16 passes sufficient extra current for the charge in capacitor 25 to be modified, during that input period, to a predetermined extent fixed through diode 27 by the −8 volts bias. Diode 27 serves also to absorb surplus current in the circuit of secondary 14— especially if there are several positive primary inputs—thereby preventing pentode 18 from being rendered conductive during any input period.

At the start of the ensuing output period the rise of waveform 26 causes pentode 18 to conduct if, and only if, the charge on capacitor 25 has been modified during the preceding input period to the predetermined extent referred to. The current, rigidly standardised by resistor 21, which during the input period flowed only in diode 22, is thereby switched to pentode 18, causing the load 20 to be enerised by a standard current pulse.

The sloping top of waveform 26 serves to maintain the capacitor charge substantially constant during each output period by neutralising the current flowing in resistor 24. The control-grid voltage of pentode 18 is thus held steady throughout each output period, whether or not capacitor 25 has had its charge modified to the predetermined extent during the preceding input period.

The fall during each output period of waveform 29 ensures that diode 28 is adequately cut-off to permit D.C. restoration of transformer 10 during that period.

Resistor 24 serves to discharge capacitor 25 after an input of positive total current, but the discharge operates only during the next input period. Damping resistor 15 ensures that the magnetisation energy of the transformer is properly dissipated.

If the algebraic sum of the primary pulses does not exceed the predetermined threshold value of positive sense the charge in capacitor 25 does not become modified sufficiently for pentode 18 to be rendered conductive during the next output period. If the sum is negative, the unbiased end of secondary 14 is negative and waveform 29 is such as to allow the secondary current to flow in diode 28 without developing an appreciable voltage which might result in the development of a positive secondary pulse during the ensuing output period.

The function of the stage is determined solely by the manner in which the three primaries 11 to 13 are pulse energised. The various biases and waveforms applied to the stage remain the same in each case, having values such that if only one of the primaries is energised by a standardised pulse of positive sense the charge on capacitor 25 becomes modified to the predetermined extent during the input period, and so causes pentode 18 to be switched on during the ensuing output period.

To enable the stage to act as a three-entry "And" gate, therefore, the three input pulses which are to actuate the gate if occurring in the same input period are all applied positively to one only of the primaries—primary 11, say—each of the other primaries 12 and 13 carrying a standardised negative pulse during every input period. Clearly, the gate will operate during any given input period only if primary 11 carries all three positive pulses, with the result that the algebraic sum in secondary 14 corresponds to one positive pulse and pentode 18 is accordingly switched on during the ensuing output period to open the gate.

If only one of primaries 12 and 13 carries a negative pulse the gate becomes a "Two-out-of-three" gate, opening after each input period during which primary 11 carries any two of its positive pulses.

If each primary winding is arranged to carry, when required, a positive pulse an "Or" gate is provided.

If one primary winding carries a positive pulse during each input period and one of the other primary windings a negative pulse during an appropriate input period, an "Inhibit" gate is provided.

The stage may be used similarly in various other ways which will be readily apparent to those skilled in the art.

Instead of using a discharge tube, the stabilised amplifier may include a transistor. A suitable arrangement is shown in Fig. 3, where each component which corresponds to a component of Fig. 1 is given the same reference with 100 added.

The transistor 118, which may conveniently be of the PNP junction type OC 71, is connected with its collector, base, and emitter electrodes in correspondence to the anode, control grid, and cathode, respectively, of pentode 18 of Fig. 1.

Each primary/secondary ratio of transformer 110 is 1:2 and the transformer inductance is 40 mh.

Each of the four germanium diodes 116, 122, 127, and 128 is connected in the reverse sense to that of the corresponding diode of Fig. 1. Diodes 116, 127 and 128 are conveniently of the type CV 425, diode 122 being of the type WG 4B.

Suitable values for resistors 115, 121, and 124 are 12, 10, and 120K respectively. Capacitor 125 has a capacitance of 1000 pf.

The values of the various source and bias potentials are shown in Fig. 3 and the ranges of the control and auxiliary waveforms 126 and 129 in Fig. 4.

The principle of operation of the stage is the same as that of the stage described with reference to Fig. 1, except that the unbiased end of secondary 114 must go negatively (rather than positively, as was the case with secondary 14 of the Fig. 1 embodiment) for diode 116 to pass sufficient extra current for the charge in capacitor 125 to be modified to the predetermined extent necessary for an output pulse to be developed during the next output period. If the above-stated convention as to the sense of the primary pulses is modified so that a positive primary current pulse is that which drives the unbiased end of secondary 114 negatively, the functions of the stage as described above with reference to Figs. 1 and 2 apply similarly to the present embodiment.

Where the transistor is of the NPN type, the four diodes require to be reversed in sense (and are then in the sense depicted in Fig. 1); the values of the components, however, remain the same as for the PNP type transistor.

The response of a logical stage in accordance with the embodiment of Fig. 3 is somewhat slower than that of a stage in which the stabilised amplifier includes a discharge tube rather than a transistor. This slower response is attributable in large part to the much greater interelectrode capacitance of a transistor over that of a discharge tube. A modified form of the embodiment of Fig. 3 in which the delay due to interelectrode capacitance is much reduced by the insertion in the amplifier of an emitter-follower or current amplifier stage will now be described with reference to Fig. 5, in which the components that function as already described with reference to Fig. 3 are given similar references, even if having different values.

In this arrangement one electrode of capacitor 125, which now has the capacitance 100 pf., is again connected by way of point 123 and resistor 124 of 120K to the +9 volt source. The other electrode, however, is connected to the collector 132 of transistor 118 of the type OC 45 and to both is applied the control voltage waveform 126[1]. This waveform corresponds in shape to and performs the same function as control waveform 126 of Fig. 4 but its potential levels, which are shown in Fig. 6, are lower by about 9 volts than the corresponding levels of waveform 126 in order that the mean D.C. level of the waveform has the −9 volts value required for the collector electrode. The base 133 of transistor 118 is connected to point 123; the emitter 134 is connected to the +9 volt source by way of a resistor 131 of 33K and to the base 135 of a second transistor 136, also of the type OC 45.

The emitter 137 of transistor 136 is connected to the +9 volt source by way of resistor 121, now of 4.7K, and by way of diode 122, now of type OA 5, to the point at zero volts. Collector 138 of this transistor is connected to the −9 volt source through the load 120.

Of the components to the left of point 123, see Fig. 3, transformer 110 has a primary ratio of 1:3 and an inductance of approximately 2.2 mh. The biased end of the secondary winding is at +1.2 volts and the value of resistor 115 is 10K. Diodes 127 and 128 are of the type OA 5, diode 127 being connected to a bias source of +0.4 volt. Diode 116 is of the type CG 10E. The auxiliary waveform 129 has the ranges shown in Fig. 6.

In operation, transistor 118 acts as an emitter-follower, driving transistor 136. As before, the standardised current, determined by resistor 121, which during the input periods flows only in diode 122, is switched to energise the load 120 by a standard current pulse during each output period that follows an input period in which the charge in capacitor 125 has been modified to the predetermined extent.

As the output impedance of transistor 118 is low, the input interelectrode capacitance of transistor 136 has negligible detrimental effect upon the performance of the stage. As regards the base/collector capacitance of transistor 118, this effectively forms part of capacitor 125 and so has no detrimental effect either.

The modified arrangement of Fig. 5 may alternatively be used not so much to increase the speed of operation as to increase the engineering flexibility of the stage, that is, to increase the number of similar stages it can drive or can respond to, or to reduce the likelihood of its response to spurious pulses. Some modification of component values will be necessary but these will readily be apparent to those skilled in the design of digital computer stages.

It should be understood that the particular types and values of the components set forth in the above descriptions of embodiments chosen to exemplify the invention are merely those that have been found suitable or convenient in particular examples and that the computer stages in accordance with the invention are in no way restricted to such components.

It will be appreciated that a logical stage in accordance with the invention possesses the great advantage of ready adaptation, without needing any changes of components, to any of the logical functions usually required in a computer, there being no redundancy of components except, in some uses, one of the primary windings. The number of primary windings is not limited to three, though for most practical applications three is the most suitable number.

What we claim is:

1. An electrical stage for performing logical functions including a transformer having a plurality of primary windings adapted to be energised by primary currents flowing in one or the other direction and a secondary winding for deriving a secondary current dependent on the algebraic sum of the primary currents, a generator for supplying a control voltage waveform defining alternate repetitive input and output periods, a capacitor so connected to said secondary winding and said generator that the charge in said capacitor is modified to a predetermined extent during each input period if and only if said secondary current during that period is of a predetermined sense and value, a stabilised amplifier having a control electrode connected to said capacitor, a resistor connected to another electrode of said amplifier, a voltage source so connected through said resistor to said other electrode of said amplifier as to produce a standardised output current during each output period if and only if the charge in said capacitor has been modified to said predetermined extent during the preceding input period, an additional generator for supplying an auxiliary voltage waveform defining said input and output periods in synchronism with said control voltage waveform, and a rectifier connecting said auxiliary waveform generator to said secondary winding, the electrodes of said rectifier being so connected to said auxiliary waveform generator and said secondary winding that the rectifier permits said secondary current to flow therethrough during each input period when the sense of said current is opposite to said predetermined sense.

2. A stage as claimed in claim 1 including a first source of bias potential connected to one end of said secondary winding, a second rectifier connecting the other end of said secondary winding to one electrode of said capacitor, said second rectifier being so connected as to conduct when said secondary current is of said predetermined sense, a second source of bias potential, and a second resistor connecting said one electrode of said capacitor to said second source of bias potential, said one electrode also being connected to said control electrode of said amplifier, the other electrode of said capacitor being connected to said control waveform generator.

3. An electrical stage for performing logical functions including a stabilised amplifier having a control electrode and a voltage source for producing a standardised output current when said amplifier is conductive, a first generator for supplying a repetitive control voltage waveform defining alternate input and output periods, a transformer having at least two primary windings adapted to be energised by primary currents flowing in one or the other direction during each input period and a secondary winding for deriving a secondary current dependent on the algebraic sum of the primary currents, a damping resistor in shunt with said secondary winding, a first source of bias potential connected to one end of said secondary winding, a second source of bias potential, first and second rectifiers having both of one set of like electrodes connected to the other end of said secondary winding and their other set connected to said control electrode and said second source of bias potential, respectively, said rectifiers being so arranged as to both conduct when said secondary current is of a predetermined sense, a capacitor connecting said first generator to said control electrode and to that electrode of said first rectifier which is connected to said control electrode, a grid leak resistor connected to said control electrode, a second generator for supplying a repetitive auxiliary voltage waveform in synchronism with said control voltage waveform, and a third rectifier connecting said second generator to said other end of said secondary winding, the electrode of said third rectifier which is connected to said secondary winding being unlike those electrodes of said first and second rectifiers which are connected to said secondary winding, said third rectifier being so arranged as to conduct when said secondary current is of opposite sense to said predetermined sense, the waveform of said control voltage being such that during each input period said amplifier is not conductive and the charge in said capacitor is modified to a predetermined extent determined by said second source of bias potential if and only if said secondary current during that input period is of said predetermined sense and of a predetermined value, and during each output period said amplifier conducts said standardised current if and only if the charge in said capacitor has been modified to said predetermined extent during the preceding input period, the waveform of said auxiliary voltage being such that during any input period when said secondary current is of opposite sense to said predetermined sense said secondary current flows in said third rectifier without developing sufficient voltage to cause said amplifier to conduct during the succeeding output period, and during each output period said third rectifier is cut off to permit direct-current restoration of said transformer.

4. A stage as claimed in claim 3 wherein the waveform of said control voltage slopes sufficiently during each output period to maintain the charge in said capacitor approximately constant during that period.

5. A stage as claimed in claim 3 wherein said amplifier includes a discharge tube and a resistor in the cathode lead thereof for standardising the output current of said tube when the latter is conductive.

6. A stage as claimed in claim 3 wherein said amplifier includes a transistor and a resistor in the emitter lead thereof for standardising the output current of said transistor when the latter is conductive.

7. A stage as claimed in claim 3 wherein said amplifier includes a first transistor, a resistor in the emitter lead thereof for standardising the output current of said first transistor when the latter is conductive, and a second transistor adapted to operate as an emitter-follower and drive said first transistor.

References Cited in the file of this patent

UNITED STATES PATENTS

| | | |
|---|---|---|
| 1,958,954 | Plebanski | May 15, 1934 |
| 2,640,105 | Bennett | May 26, 1953 |
| 2,736,880 | Forrester | Feb. 28, 1956 |
| 2,824,222 | Furlow | Feb. 18, 1958 |
| 2,856,526 | Merrill | Oct. 14, 1958 |

FOREIGN PATENTS

| | | |
|---|---|---|
| 534,648 | Canada | Dec. 18, 1956 |